(12) United States Patent
Diao et al.

(10) Patent No.: US 11,512,229 B2
(45) Date of Patent: Nov. 29, 2022

(54) POLYURETHANE FOAM AND METHODS OF FORMING THE SAME

(71) Applicant: SAINT-GOBAIN PERFORMANCE PLASTICS CORPORATION, Solon, OH (US)

(72) Inventors: Qing Diao, Shanghai (CN); Yue Dong, Shanghai (CN); Russell S. Cook, Whitehall, NY (US); James N. Gordon, Waban, MA (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 97 days.

(21) Appl. No.: 16/712,286

(22) Filed: Dec. 12, 2019

(65) Prior Publication Data

US 2020/0208018 A1    Jul. 2, 2020

Related U.S. Application Data

(60) Provisional application No. 62/790,744, filed on Jan. 10, 2019.

(30) Foreign Application Priority Data

Dec. 27, 2018  (CN) .......................... 201811615620.0

(51) Int. Cl.
*C09J 7/26* (2018.01)
*C08G 18/08* (2006.01)
(Continued)

(52) U.S. Cl.
CPC ................... *C09J 7/26* (2018.01); *B32B 5/18* (2013.01); *B32B 27/065* (2013.01); *C08G 18/14* (2013.01); *C08G 18/4277* (2013.01); *C08G 18/7664* (2013.01); *C08J 9/0066* (2013.01); *C09J 7/25* (2018.01); *C09J 7/30* (2018.01); *B32B 2250/02* (2013.01); *B32B 2266/0278* (2013.01);
(Continued)

(58) Field of Classification Search
None
See application file for complete search history.

(56) References Cited

U.S. PATENT DOCUMENTS 3,993,608 A    11/1976  Wells
4,082,702 A     4/1978  Harper
(Continued)

FOREIGN PATENT DOCUMENTS

JP    S55-155016 A    12/1980
WO    2016075753 A1    4/2017

OTHER PUBLICATIONS

International Search Report and Written Opinion for PCT Application No. PCT/US2019/065982, dated Apr. 9, 2020, 9 pages.

*Primary Examiner* — Chinessa T. Golden
(74) *Attorney, Agent, or Firm* — Abel Schillinger, LLP; Chi Suk Kim

(57) ABSTRACT

A polyurethane foam may include an isocyanate polymer component and a polyol component. The polyol component may include a polyol having a molecular weight of at least about 500 kg/mol and not greater than about 6000 kg/mol. The polyurethane foam may have an elongation of at least about 500%. The polyurethane foam may further have a density of at least about 250 g/L and a tensile strength of not greater than about 1000 kPa.

20 Claims, 1 Drawing Sheet

(51) Int. Cl.
*C08G 18/42* (2006.01)
*C09J 7/25* (2018.01)
*C09J 7/30* (2018.01)
*C08J 9/00* (2006.01)
*B32B 5/18* (2006.01)
*B32B 27/06* (2006.01)
*C08G 18/76* (2006.01)
*C08K 7/22* (2006.01)
*C08K 3/26* (2006.01)

(52) U.S. Cl.
CPC ..... *B32B 2307/732* (2013.01); *B32B 2405/00* (2013.01); *C08G 2110/0066* (2021.01); *C08K 7/22* (2013.01); *C08K 2003/265* (2013.01); *C09J 2301/41* (2020.08); *C09J 2433/00* (2013.01); *C09J 2475/006* (2013.01)

(56) References Cited

U.S. PATENT DOCUMENTS

| | | |
|---|---|---|
| 4,280,007 A | 7/1981 | Meisert et al. |
| 5,681,868 A | 10/1997 | Waldenberger et al. |
| 6,221,929 B1 | 4/2001 | Ryugo et al. |
| 6,455,606 B1 | 9/2002 | Kaku et al. |
| 6,525,162 B1 | 2/2003 | Altounian |
| 6,706,776 B2 | 3/2004 | Markusch et al. |
| 7,781,056 B2 | 8/2010 | Bries et al. |
| 2002/0010223 A1 | 1/2002 | Botrie |
| 2004/0122253 A1* | 6/2004 | Smith ............ C08G 18/10 560/26 |
| 2006/0079589 A1 | 4/2006 | Tadokoro et al. |
| 2012/0186433 A1 | 7/2012 | Braiewa et al. |
| 2014/0374976 A1* | 12/2014 | Yang ............ C08G 18/7837 267/292 |
| 2017/0121579 A1 | 5/2017 | Blomker et al. |

* cited by examiner

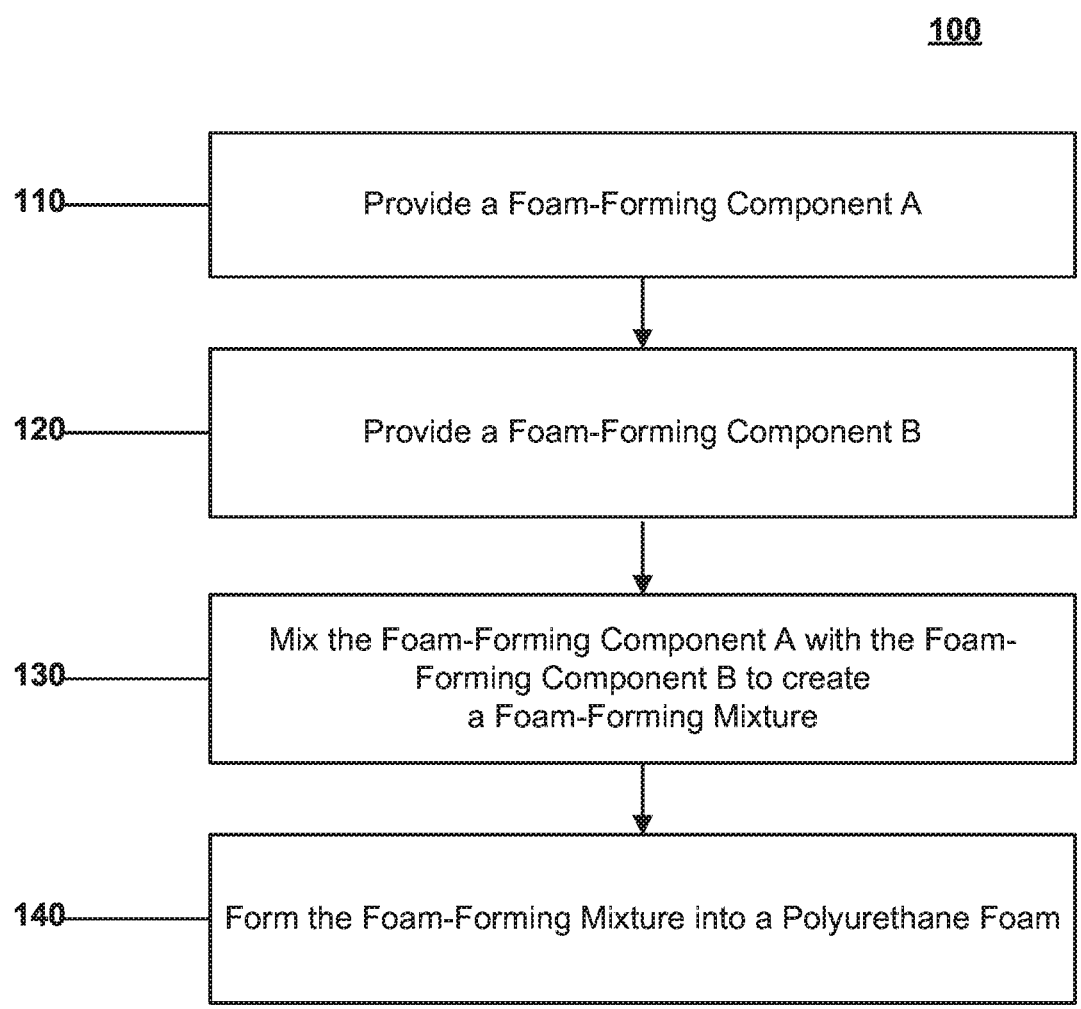

POLYURETHANE FOAM AND METHODS OF FORMING THE SAME

CROSS-REFERENCE TO RELATED APPLICATIONS

This application claims priority to Chinese Patent Application No. 201811615620.0, filed Dec. 27, 2018, entitled "POLYURETHANE FOAM AND METHODS OF FORMING THE SAME," by Qing DIAO et al., and this application further claims priority under 35 U.S.C. § 119(e) to U.S. Provisional Patent Application No. 62/790,744, filed Jan. 10, 2019, entitled "POLYURETHANE FOAM AND METHODS OF FORMING THE SAME," by Qing DIAO et al., which both applications are assigned to the current assignee hereof and incorporated herein by reference in their entireties.

FIELD OF THE DISCLOSURE

The present disclosure relates to a polyurethane foam and methods of forming the same, more particularly, the present disclosure relates to a polyurethane foam having a high elongation with a sufficient tensile strength to facilitate high peel strength when used in an adhesive tape and methods of forming the same.

BACKGROUND

Foam tapes used in applications requiring high peel strength generally include acrylic foam materials because the acrylic foam materials also have high elongation performance. Foam tapes that include polyurethane foam materials generally have low peel strength because the polyurethane foam materials have low elongation performance, which reduces energy dissipation. However, polyurethane foam materials can have some advantages over acrylic materials, such as, higher oil and solvent resistance, higher toughness, a simpler curing process and a wider service temperature range. Accordingly, polyurethane foam formulations with high elongation that can be used in foam tape applications requiring high peel strength are desired.

SUMMARY

According to a first aspect, a polyurethane foam may include an isocyanate polymer component and a polyol component. The polyol component may include a polyol having a molecular weight of at least about 500 kg/mol and not greater than about 6000 kg/mol. The polyurethane foam may have an elongation of at least about 500%.

According to yet another aspect, a polyurethane foam may include an isocyanate polymer component and a polyol component. The polyol component may include a polyol having a molecular weight of at least about 500 kg/mol and not greater than about 6000 kg/mol. The polyurethane foam may have a density of at least about 250 g/L.

According to still another aspect, a polyurethane foam may include an isocyanate polymer component and a polyol component. The polyol component may include a polyol having a molecular weight of at least about 500 kg/mol and not greater than about 6000 kg/mol. The polyurethane foam may have a tensile strength of not greater than about 1000 kPa.

According to yet another aspect, an adhesive tape may include a layer of a polyurethane foam and an acrylic adhesive layer overlying a surface of the layer of the polyurethane foam. The polyurethane foam may include an isocyanate polymer component and a polyol component. The polyol component may include a polyol having a molecular weight of at least about 500 kg/mol and not greater than about 6000 kg/mol. The polyurethane foam may have an elongation of at least about 500%.

According to still another aspect, an adhesive tape may include a layer of a polyurethane foam and an acrylic adhesive layer overlying a surface of the layer of the polyurethane foam. The polyurethane foam may include an isocyanate polymer component and a polyol component. The polyol component may include a polyol having a molecular weight of at least about 500 kg/mol and not greater than about 6000 kg/mol. The polyurethane foam may have a density of at least about 250 g/L.

According to yet another aspect, an adhesive tape may include a layer of a polyurethane foam and an acrylic adhesive layer overlying a surface of the layer of the polyurethane foam. The polyurethane foam may include an isocyanate polymer component and a polyol component. The polyol component may include a polyol having a molecular weight of at least about 500 kg/mol and not greater than about 6000 kg/mol. The polyurethane foam may have a tensile strength of not greater than about 1000 kPa.

According to another aspect, an adhesive tape may include a layer of a polyurethane foam and an acrylic adhesive layer overlying a surface of the layer of the polyurethane foam. The polyurethane foam may include an isocyanate polymer component and a polyol component. The polyol component may include a polyol having a molecular weight of at least about 500 kg/mol and not greater than about 6000 kg/mol. The adhesive tape may have a peel strength of at least about 10 N/cm.

According to yet another aspect, a method of forming a polyurethane foam may include providing a foam-forming component A, providing a foam-forming component B, mixing the foam-forming component A and the foam-forming component B to form a foam-forming mixture, and forming the foam-forming mixture into a polyurethane foam. The foam-forming component A may include a polyol component. The polyol component may include a polyol having a molecular weight of at least about 500 kg/mol and not greater than about 6000 kg/mol. The foam-forming component B may include an isocyanate polymer component.

BRIEF DESCRIPTION OF THE DRAWINGS

Embodiments are illustrated by way of example and are not limited to the accompanying FIGURES.

FIG. 1 includes a diagram showing a polyurethane foam forming method 100 according to embodiments described herein.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Embodiments described herein are generally directed to a polyurethane foam and methods of forming the same, and more particularly, to a polyurethane foam having a high elongation with sufficient tensile strength to facilitate high peel strength when used in an adhesive tape.

For purposes of illustration, FIG. 1 includes a diagram showing a polyurethane foam forming method 100 according to particular embodiments described herein. The polyurethane forming method 100 may include a first step 110 of providing a foam-forming component A, a second step 120 of providing a foam-forming component B, a third step 130 of mixing the foam-forming component A and the foam-forming component B to create a foam-forming mixture, and a fourth step 140 of forming the foam-forming mixture into a polyurethane foam.

Referring to the first step 110 of the polyurethane foam forming method 100, according to certain embodiments, the foam-forming component A may include a polyol component.

According to certain embodiments, the foam-forming component A may include a particular content of the polyol component. For example, the foam-forming component A may include a content of the polyol component of at least about 35 wt. % for a total weight of the foam-forming component A, such as, at least about 40 wt. % or at least about 45 wt. % or at least about 50 wt. % or at least about 55 wt. % or at least about 60 wt. % or at least about 65 wt. % or even at least about 70 wt. %. According to still other embodiments, the foam-forming component A may include a content of the polyol component of not greater than about 100 wt. % for a total weight of the foam-forming component A, such as, not greater than about 99 wt. % or not greater than about 98 wt. % or not greater than about 97 wt. % or not greater than about 96 wt. % or not greater than about 95 wt. % or not greater than about 94 wt. % or not greater than about 93 wt. % or not greater than about 92 wt. % or not greater than about 91 wt. % or even not greater than about 90 wt. %. It will be appreciated that the content of the polyol component in the foam-forming component A may be within a range between any of the minimum and maximum values noted above. It will be further appreciated that the content of the polyol component in the foam-forming component A may be any value between any of the minimum and maximum values noted above.

According to certain embodiments, the polyol component of the foam-forming component A may include a polyol having a particular molecular weight. For example, the polyol of the polyol component may have a molecular weight of at least about 500 kg/mol, such as, at least about 550 kg/mol or at least about 600 kg/mol or at least about 650 kg/mol or at least about 700 kg/mol or at least about 750 kg/mol or at least about 800 kg/mol or at least about 850 kg/mol or at least about 900 kg/mol or at least about 950 kg/mol or at least about 1000 kg/mol or at least about 1050 kg/mol or at least about 1100 kg/mol or at least about 1150 kg/mol or at least about 1200 kg/mol or at least about 1250 kg/mol or at least about 1300 kg/mol or at least about 1350 kg/mol or at least about 1400 kg/mol or even at least about 1500 kg/mol. According to still other embodiments, the polyol component may have a molecular weight of not greater than about 6000 kg/mol, such as, not greater than about 5750 kg/mol or not greater than about 5500 kg/mol or not greater than about 5250 kg/mol or not greater than about 5000 kg/mol or not greater than about 4750 kg/mol or not greater than about 4500 kg/mol or not greater than about 4250 kg/mol or not greater than about 4000 kg/mol or not greater than about 3750 kg/mol or not greater than about 3500 kg/mol or not greater than about 3250 kg/mol or even not greater than about 3000 kg/mol. It will be appreciated that the molecular weight of the polyol may be within a range between any of the minimum and maximum values noted above. It will be further appreciated that the molecular weight of the polyol may be any value between any of the minimum and maximum values noted above.

According to certain embodiments, the polyol component of the foam-forming component A may include a polyether polyol. According to still other embodiments, the polyol component of the foam-forming component A may include a polyester polyol. According to yet other embodiments, the polyol component of the foam-forming component A may include a combination of a polyether polyol and a polyester polyol.

According to still other embodiments, the polyol component of the foam-forming component A may further include a chain extender. According to yet other embodiments, the polyol component of the foam-forming component A may further include a catalyst. According to yet other embodiments, the polyol component may also include a surfactant. According to still other embodiments, the polyol component of the foam-forming component A may further include an additive. According to yet other embodiments, the polyol of the foam-forming component A may include any combination of a chain extender, a catalyst, a surfactant and an additive.

According to yet other embodiments, the polyol component of the foam-forming component A may include a polycaprolactone polyol.

According to still other embodiments, the polyol component of the foam-forming component A may include a particular content of the polycaprolactone polyol. For example, the polyol component of the foam-forming component A may include a content of the polycaprolactone polyol of at least about 5 wt. % for a total weight of the polyol component, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or even at least about 15 wt. %. According to still other embodiments, the polyol component of the foam-forming component A may include a content of the polycaprolactone polyol of not greater than about 30 wt. % for a total weight of the polyol component, such as, not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or even not greater than about 18 wt. %. It will be appreciated that the content of the polycaprolactone polyol in the polyol component may be within a range between any of the minimum and maximum values noted above. It will be further appreciated that the content of the polycaprolactone polyol in the polyol component may be any value between any of the minimum and maximum values noted above.

According to still other embodiments, the foam-forming component A may further include a hollow filler.

According to certain embodiments, the foam-forming component A may include a particular content of the hollow filler. For example, the foam-forming component A may include a content of the hollow filler of at least about 4.0 wt. % for a total weight of the foam-forming component A, such as, at least about 4.5 wt. % or at least about 5.0 wt. % or at least about 5.5 wt. % or at least about 6.0 wt. % or at least about 6.5 wt. % or at least about 7.0 wt. % or at least about 7.5 wt. % or at least about 8.0 wt. % or at least about 8.5 wt. % or at least about 9.0 wt. % or at least about 9.5 wt. % or even at least about 10.0 wt. %. According to still other embodiments, the foam-forming component A may include a content of the hollow filler of not greater than about 25 wt. % for a total weight of the foam-forming component A, such as, not greater than about 24.5 wt. % or not greater than about 24.0 wt. % or not greater than about 23.5 wt. % or not greater than about 23.0 wt. % or not greater than about 22.5 wt. % or not greater than about 22.0 wt. % or not greater than about 21.5 wt. % or not greater than about 21.0 wt. % or not greater than about 20.5 wt. % or not greater than about 20.0 wt. % or not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or even not greater than about 12.0 wt. %. It will be appreciated that the content of the hollow filler in the foam-forming component A may be within a range between any of the minimum and maximum values noted above. It will be further appreciated that the content of the hollow filler in the foam-forming component A may be any value between any of the minimum and maximum values noted above.

According to still other embodiments, the foam-forming component A may further include a calcium carbonate filler.

According to certain embodiments, the foam-forming component A may include a particular content of the calcium carbonate filler. For example, the foam-forming component A may include a content of the calcium carbonate filler of at least about 3 wt. % for a total weight of the foam-forming component A, such as, at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or even at least about 7.5 wt. %. According to still other embodiments, the foam-forming component A may include a content of the calcium carbonate filler of not greater than about 20 wt. % for a total weight of the foam-forming component A, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or even not greater than about 12.0 wt. %. It will be appreciated that the content of the calcium carbonate filler in the foam-forming component A may be within a range between any of the minimum and maximum values noted above. It will be further appreciated that the content of the calcium carbonate filler in the foam-forming component A may be any value between any of the minimum and maximum values noted above.

According to still other embodiments, the foam-forming component A may further include a chain extender.

According to certain embodiments, the foam-forming component A may include a particular content of the chain extender. For example, the foam-forming component A may include a content of the chain extender of at least about 2.5 wt. % for a total weight of the foam-forming component A, such as, at least about 2.75 wt. % or at least about 3.0 wt. % or at least about 3.25 wt. % or at least about 3.5 wt. % or at least about 3.75 wt. % or at least about 4.0 wt. % or at least about 4.25 wt. % or at least about 4.5 wt. % or even at least about 4.75 wt. %. According to still other embodiments, the foam-forming component A may include a content of the chain extender of not greater than about 10 wt. % for a total weight of the foam-forming component A, such as, not greater than about 9.75 wt. % or not greater than about 9.5 wt. % or not greater than about 9.25 wt. % or not greater than about 9.0 wt. % or not greater than about 8.75 wt. % or not greater than about 8.5 wt. % or not greater than about 8.25 wt. % or not greater than about 8.0 wt. % or not greater than about 7.75 wt. % or not greater than about 7.5 wt. % or not greater than about 7.25 wt. % or not greater than about 7.0 wt. % or not greater than about 6.25 wt. % or not greater than about 6.0 wt. % or not greater than about 6.75 wt. % or even not greater than about 6.5 wt. %. It will be appreciated that the content of the chain extender in the foam-forming component A may be within a range between any of the minimum and maximum values noted above. It will be further appreciated that the content of the chain extender in the foam-forming component A may be any value between any of the minimum and maximum values noted above.

According to still other embodiments, the foam-forming component A may further include a surfactant.

According to certain embodiments, the foam-forming component A may include a particular content of the surfactant. For example, the foam-forming component A may include a content of the surfactant of at least about 0.4 wt. % for a total weight of the foam-forming component A, such as, at least about 0.5 wt. % or at least about 0.6 wt. % or at least about 0.7 wt. % or at least about 0.8 wt. % or at least about 0.9 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to still other embodiments, the foam-forming component A may include a content of the surfactant of not greater than about 12 wt. % for a total weight of the foam-forming component A, such as, not greater than about 11.5 wt. % or not greater than about 11.0 wt. % or not greater than about 10.5 wt. % or not greater than about 10.0 wt. % or not greater than about 9.5 wt. % or not greater than about 9.0 wt. % or not greater than about 8.5 wt. % or not greater than about 8.0 wt. % or not greater than about 7.5 wt. % or even not greater than about 7.0 wt. %. It will be appreciated that the content of the surfactant in the foam-forming component A may be within a range between any of the minimum and maximum values noted above. It will be further appreciated that the content of the surfactant in the foam-forming component A may be any value between any of the minimum and maximum values noted above.

Referring now to the second step 120 of the polyurethane foam foaming method 100, according to certain embodiments, the foam-forming component B may include an isocyanate polymer component. According to certain embodiments, the isocyanate polymer component may include a MDI prepolymer. According to other embodiments, the isocyanate polymer component may include PMDI. According to yet other embodiments, the isocyanate polymer component may include a combination of PMDI and a MDI prepolymer.

According to certain embodiments, the foam-forming component B may include a particular content of the isocyanate polymer. For example, the foam-forming component B may include a content of the isocyanate polymer of at least about 90.0 wt. % for a total weight of the foam-forming component B, such as, at least about 90.5 wt. % or at least about 91.0 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or at least about 95.0 wt. % or at least about 95.5 wt. % or at least about 96.0 wt. % or at least about 96.5 wt. % or at least about 97.0 wt. % or at least about 97.5 wt. % or even at least about 98.0 wt. %. According to still other embodiments, the foam-forming component B may include a content of the isocyanate polymer of not greater than about 100 wt. % for a total weight of the foam-forming component B, such as, not greater than about 99.9 wt. % or not greater than about 99.8 wt. % or not greater than about 99.7 wt. % or not greater than about 99.6 wt. % or not greater than about 99.5 wt. % or not greater than about 99.4 wt. % or not greater than about 99.3 wt. % or not greater than about 99.2 wt. % or not greater than about 99.1 wt. % or even not greater than about 99.0 wt. %. It will be appreciated that the content of the isocyanate polymer in the foam-forming component B may be within a range between any of the minimum and maximum values noted above. It will be further appreciated that the content of the isocyanate polymer in the foam-forming component B may be any value between any of the minimum and maximum values noted above.

According to certain embodiments, the foam-forming mixture may include a particular content of the polyol component. For example, the foam-forming mixture may include a content of the polyol component of at least about 30 wt. % for a total weight of the foam-forming mixture, such as, at least about 35 wt. % or at least about 40 wt. % or at least about 45 wt. % or at least about 50 wt. % or at least about 55 wt. % or even at least about 60 wt. %. According to still other embodiments, the foam-forming mixture may include a content of the polyol component of not greater than about 85 wt. % for a total weight of the foam-forming mixture, such as, not greater than about 84 wt. % or not greater than about 83 wt. % or not greater than about 82 wt. % or not greater than about 81 wt. % or not greater than about 80 wt. % or not greater than about 79 wt. % or not greater than about 78 wt. % or not greater than about 77 wt. % or not greater than about 76 wt. % or not greater than about 75 wt. % or not greater than about 74 wt. % or not greater than about 73 wt. % or not greater than about 72 wt. % or not greater than about 71 wt. % or even not greater than about 70 wt. %. It will be appreciated that the content of the polyol component in the foam-forming mixture may be within a range between any of the minimum and maximum values noted above. It will be further appreciated that the content of the polyol component in the foam-forming mixture may be any value between any of the minimum and maximum values noted above.

According to certain embodiments, the polyol component of the foam-forming mixture may include a polyol having a particular molecular weight. For example, the polyol of the polyol component may have a molecular weight of at least about 500 kg/mol, such as, at least about 550 kg/mol or at least about 600 kg/mol or at least about 650 kg/mol or at least about 700 kg/mol or at least about 750 kg/mol or at least about 800 kg/mol or at least about 850 kg/mol or at least about 900 kg/mol or at least about 950 kg/mol or at least about 1000 kg/mol or at least about 1050 kg/mol or at least about 1100 kg/mol or at least about 1150 kg/mol or at least about 1200 kg/mol or at least about 1250 kg/mol or at least about 1300 kg/mol or at least about 1350 kg/mol or at least about 1400 kg/mol or even at least about 1500 kg/mol. According to still other embodiments, the polyol component may have a molecular weight of not greater than about 6000 kg/mol, such as, not greater than about 5750 kg/mol or not greater than about 5500 kg/mol or not greater than about 5250 kg/mol or not greater than about 5000 kg/mol or not greater than about 4750 kg/mol or not greater than about 4500 kg/mol or not greater than about 4250 kg/mol or not greater than about 4000 kg/mol or not greater than about 3750 kg/mol or not greater than about 3500 kg/mol or not greater than about 3250 kg/mol or even not greater than about 3000 kg/mol. It will be appreciated that the molecular weight of the polyol may be within a range between any of the minimum and maximum values noted above. It will be further appreciated that the molecular weight of the polyol may be any value between any of the minimum and maximum values noted above.

According to certain embodiments, the polyol component of the foam-forming mixture may include a polyether polyol. According to still other embodiments, the polyol component of the foam-forming mixture may include a polyester polyol. According to yet other embodiments, the polyol component of the foam-forming mixture may include a combination of a polyether polyol and a polyester polyol.

According to still other embodiments, the polyol component of the foam-forming mixture may further include a chain extender. According to yet other embodiments, the polyol component of the foam-forming mixture may further include a catalyst. According to yet other embodiments, the polyol component may also include a surfactant. According to still other embodiments, the polyol component of the foam-forming mixture may further include an additive. According to yet other embodiments, the polyol of the foam-forming mixture may include any combination of a chain extender, a catalyst, a surfactant and an additive.

According to yet other embodiments, the polyol component of the foam-forming mixture may include a polycaprolactone polyol.

According to still other embodiments, the polyol component of the foam-forming mixture may include a particular content of the polycaprolactone polyol. For example, the polyol component of the foam-forming mixture may include a content of the polycaprolactone polyol of at least about 5 wt. % for a total weight of the polyol component, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %. According to still other embodiments, the polyol component of the foam-forming mixture may include a content of the polycaprolactone polyol of not greater than about 30 wt. % for a total weight of the polyol component, such as, not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %. It will be appreciated that the content of the polycaprolactone polyol in the polyol component may be within a range between any of the minimum and maximum values noted above. It will be further appreciated that the content of the polycaprolactone polyol in the polyol component may be any value between any of the minimum and maximum values noted above.

According to still other embodiments, the foam-forming mixture may include a hollow filler.

According to certain embodiments, the foam-forming mixture may include a particular content of the hollow filler. For example, the foam-forming mixture may include a content of the hollow filler of at least about 3 wt. % for a total weight of the foam-forming mixture, such as, at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or even at least about 7.5 wt. %. According to still other embodiments, the foam-forming mixture may include a content of the hollow filler of not greater than about 20 wt. % for a total weight of the foam-forming mixture, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or even not greater than about 12.0 wt. %. It will be appreciated that the content of the hollow filler in the foam-forming mixture may be within a range between any of the minimum and maximum values noted above. It will be further appreciated that the content of the hollow filler in the foam-forming mixture may be any value between any of the minimum and maximum values noted above.

According to still other embodiments, the foam-forming mixture may further include a calcium carbonate filler.

According to certain embodiments, the foam-forming mixture may include a particular content of the calcium carbonate filler. For example, the foam-forming mixture may include a content of the calcium carbonate filler of at least about 2.0 wt. % for a total weight of the foam-forming mixture, such as, at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or even at least about 7.5 wt. %. According to still other embodiments, the foam-forming mixture may include a content of the calcium carbonate filler of not greater than about 10 wt. % for a total weight of the foam-forming mixture, such as, not greater than about 9.5 wt. % or not greater than about 9.0 wt. % or not greater than about 8.5 wt. % or even not greater than about 8.0 wt. %. It will be appreciated that the content of the calcium carbonate filler in the foam-forming mixture may be within a range between any of the minimum and maximum values noted above. It will be further appreciated that the content of the calcium carbonate filler in the foam-forming mixture may be any value between any of the minimum and maximum values noted above.

According to still other embodiments, the foam-forming mixture may further include a chain extender.

According to certain embodiments, the foam-forming mixture may include a particular content of the chain extender. For example, the foam-forming mixture may include a content of the chain extender of at least about 2.0 wt. % for a total weight of the foam-forming mixture, such as, at least about 2.25 wt. % or at least about 2.5 wt. % or t least about 2.75 wt. % or at least about 3.0 wt. % or at least about 3.25 wt. % or at least about 3.5 wt. % or at least about 3.75 wt. % or even at least about 4.0 wt. %. According to still other embodiments, the foam-forming mixture may include a content of the chain extender of not greater than about 8 wt. % for a total weight of the foam-forming mixture, such as, not greater than about 8.75 wt. % or not greater than about 8.5 wt. % or not greater than about 8.25 wt. % or not greater than about 8.0 wt. % or not greater than about 7.75 wt. % or not greater than about 7.5 wt. % or not greater than about 7.25 wt. % or not greater than about 7.0 wt. % or not greater than about 6.25 wt. % or not greater than about 6.0 wt. % or not greater than about 6.75 wt. % or even not greater than about 6.5 wt. %. It will be appreciated that the content of the chain extender in the foam-forming mixture may be within a range between any of the minimum and maximum values noted above. It will be further appreciated that the content of the chain extender in the foam-forming mixture may be any value between any of the minimum and maximum values noted above.

According to still other embodiments, the foam-forming mixture may further include a surfactant.

According to certain embodiments, the foam-forming mixture may include a particular content of the surfactant. For example, the foam-forming mixture may include a content of the surfactant of at least about 0.3 wt. % for a total weight of the foam-forming mixture, such as, at least about 0.4 wt. % or at least about 0.5 wt. % or at least about 0.6 wt. % or at least about 0.7 wt. % or at least about 0.8 wt. % or at least about 0.9 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to still other embodiments, the foam-forming mixture may include a content of the surfactant of not greater than about 10 wt. % for a total weight of the foam-forming mixture, such as, not greater than about 9.5 wt. % or not greater than about 9.0 wt. % or not greater than about 8.5 wt. % or not greater than about 8.0 wt. % or not greater than about 7.5 wt. % or even not greater than about 7.0 wt. %. It will be appreciated that the content of the surfactant in the foam-forming mixture may be within a range between any of the minimum and maximum values noted above. It will be further appreciated that the content of the surfactant in the foam-forming mixture may be any value between any of the minimum and maximum values noted above.

According to certain embodiments, the foam-forming mixture may include a particular content of the isocyanate polymer. For example, the foam-forming mixture may include a content of the isocyanate polymer of at least about 12 wt. % for a total weight of the foam-forming mixture, such as, at least about 13 wt. % or at least about 14 wt. % or at least about 15 wt. % or at least about 20 wt. % or even at least about 25 wt. %. According to still other embodiments, the foam-forming mixture may include a content of the isocyanate polymer of not greater than about 40 wt. % for a total weight of the foam-forming mixture, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or even not greater than about 30 wt. %. It will be appreciated that the content of the isocyanate polymer in the foam-forming mixture may be within a range between any of the minimum and maximum values noted above. It will be further appreciated that the content of the isocyanate polymer in the foam-forming mixture may be any value between any of the minimum and maximum values noted above.

Referring now to the fourth step 140, according to yet other embodiments, forming the foam-forming mixture into a polyurethane foam may include foaming the foam-forming mixture to form a foamed material mixture. According to still other embodiments, forming the foam-forming mixture into a polyurethane foam may further include curing the foamed material mixture to form the polyurethane foam.

Referring now to the polyurethane foam formed according to embodiments described herein, the polyurethane foam may include an isocyanate polymer component and a polyol component.

According to certain embodiments, the polyol component of the polyurethane foam may include a polyol having a particular molecular weight. For example, the polyol of the polyol component may have a molecular weight of at least about 500 kg/mol, such as, at least about 550 kg/mol or at least about 600 kg/mol or at least about 650 kg/mol or at least about 700 kg/mol or at least about 750 kg/mol or at least about 800 kg/mol or at least about 850 kg/mol or at least about 900 kg/mol or at least about 950 kg/mol or at least about 1000 kg/mol or at least about 1050 kg/mol or at least about 1100 kg/mol or at least about 1150 kg/mol or at least about 1200 kg/mol or at least about 1250 kg/mol or at least about 1300 kg/mol or at least about 1350 kg/mol or at least about 1400 kg/mol or even at least about 1500 kg/mol. According to still other embodiments, the polyol component may have a molecular weight of not greater than about 6000 kg/mol, such as, not greater than about 5750 kg/mol or not greater than about 5500 kg/mol or not greater than about 5250 kg/mol or not greater than about 5000 kg/mol or not greater than about 4750 kg/mol or not greater than about 4500 kg/mol or not greater than about 4250 kg/mol or not greater than about 4000 kg/mol or not greater than about 3750 kg/mol or not greater than about 3500 kg/mol or not greater than about 3250 kg/mol or even not greater than about 3000 kg/mol. It will be appreciated that the molecular weight of the polyol may be within a range between any of the minimum and maximum values noted above. It will be further appreciated that the molecular weight of the polyol may be any value between any of the minimum and maximum values noted above.

According to still other embodiments, the polyurethane foam formed according to embodiments described herein may have a particular elongation. For purposes of embodiments described herein, elongation may be measured according to ISO 37. According to certain embodiments, the polyurethane foam may have an elongation of at least about 500%, such as, at least about 525% or at least about 550% or at least about 575% or at least about 600% or at least about 625% or at least about 650% or at least about 675% or at least about 700% or at least about 725% or at least about 750% or at least about 775% or at least about 800% or at least about 825% or at least about 850% or at least about 875% or at least about 900% or at least about 925% or at least about 950% or at least about 975% or at least about 1025% or at least about 1050% or at least about 1075% or at least about 1100% or at least about 1125% or at least about 1150% or at least about 1200% or at least about 1225% or at least about 1250% or at least about 1275% or at least about 1300% or at least about 1325% or at least about 1350% or at least about 1375% or at least about 1400% or at least about 1425% or at least about 1450% or at least about 1475% or even at least about 1500%. According to still other embodiments, the polyurethane foam may have an elongation of not greater than about 2500%. It will be appreciated that the elongation of the polyurethane foam may be within a range between any of the minimum and maximum values noted above. It will be further appreciated that the elongation of the polyurethane foam may be any value between any of the minimum and maximum values noted above.

According to still other embodiments, the polyurethane foam formed according to embodiments described herein may have a particular density. For purposes of embodiments described herein, density may be measured according to ISO 1183. According to certain embodiments, the polyurethane foam may have a density of at least about 250 g/L, such as, at least about 275 g/L or at least about 300 g/L or at least about 325 g/L or at least about 350 g/L or at least about 375 g/L or at least about 400 g/L or at least about 425 g/L or at least about 450 g/L or at least about 475 g/L or at least about 500 g/L. According to still other embodiments, the polyurethane foam may have a density of not greater than about 1000 g/L. It will be appreciated that the density of the polyurethane foam may be within a range between any of the minimum and maximum values noted above. It will be further appreciated that the density of the polyurethane foam may be any value between any of the minimum and maximum values noted above.

According to still other embodiments, the polyurethane foam formed according to embodiments described herein may have a particular tensile strength. For purposes of embodiments described herein, tensile strength may be measured according to ISO 37. According to certain embodiments, the polyurethane foam may have a tensile strength of not greater than about 1000 kPa, such as, not greater than about 950 kPa or not greater than about 900 kPa or not greater than about 850 kPa or not greater than about 800 kPa or not greater than about 750 kPa or not greater than about 700 kPa or not greater than about 650 kPa or not greater than about 600 kPa or not greater than about 550 kPa or not greater than about 500 kPa. According to still other embodiments, the polyurethane foam may have a tensile strength of at least about 200 kPa. It will be appreciated that the tensile strength of the polyurethane foam may be within a range between any of the minimum and maximum values noted above. It will be further appreciated that the tensile strength of the polyurethane foam may be any value between any of the minimum and maximum values noted above.

According to still other embodiments, the polyurethane foam formed according to embodiments described herein may have a particular content of the isocyanate polymer component. For example, the polyurethane foam may have a content of the isocyanate polymer component of at least about 12 wt. % for a total weight of the polyurethane foam, such as, at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or even at least about 24 wt. % or at least about 25 wt. %. According to yet other embodiments, the polyurethane foam may have a content of the isocyanate polymer component of not greater than about 40 wt. % for a total weight of the polyurethane foam, such as, not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or even not greater than about 26 wt. %. It will be appreciated that the content of the isocyanate polymer component in the polyurethane foam may be within a range between any of the minimum and maximum values noted above. It will be further appreciated that the content of the isocyanate polymer component in the polyurethane foam may be any value between any of the minimum and maximum values noted above.

According to certain embodiments, the isocyanate polymer component may include a MDI prepolymer. According to other embodiments, the isocyanate polymer component may include PMDI. According to yet other embodiments, the isocyanate polymer component may include a combination of PMDI and a MDI prepolymer.

According to yet other embodiments, the polyurethane foam formed according to embodiments described herein may have a particular content of the polyol component. For example, the polyurethane foam may have a content of the polyol component of at least about 30 wt. % for a total weight of the polyurethane foam, such as, at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. % or at least about 46 wt. % or at least about 47 wt. % or at least about 48 wt. % or at least about 49 wt. % or at least about 50 wt. % or at least about 51 wt. % or at least about 52 wt. % or at least about 53 wt. % or at least about 54 wt. % or even at least about 55 wt. %. According to still other embodiments, the polyurethane foam may have a content of the polyol component of not greater than about 85 wt. % for a total weight of the polyurethane foam, such as, not greater than about 84 wt. % or not greater than about 83 wt. % or not greater than about 82 wt. % or not greater than about 81 wt. % or not greater than about 80 wt. % or not greater than about 79 wt. % or not greater than about 78 wt. % or not greater than about 77 wt. % or not greater than about 76 wt. % or not greater than about 75 wt. % or not greater than about 74 wt. % or not greater than about 73 wt. % or not greater than about 72 wt. % or not greater than about 71 wt. % or not greater than about 70 wt. % or not greater than about 69 wt. % or not greater than about 68 wt. % or not greater than about 67 wt. % or not greater than about 66 wt. % or not greater than about 65 wt. % or not greater than about 64 wt. % or not greater than about 63 wt. % or not greater than about 62 wt. % or not greater than about 61 wt. % or even not greater than about 60 wt. %. It will be appreciated that the content of the polyol component in the polyurethane foam may be within a range between any of the minimum and maximum values noted above. It will be further appreciated that the content of the polyol component in the polyurethane foam may be any value between any of the minimum and maximum values noted above.

According to yet other embodiments, the polyol component of the polyurethane foam may include a polyether polyol. According to still other embodiments, the polyol component of the polyurethane foam may include a polyester polyol. According to yet other embodiments, the polyol component of the polyurethane foam may include a combination of a polyether polyol and a polyester polyol.

According to still other embodiments, the polyol component of the polyurethane foam may further include a chain extender. According to yet other embodiments, the polyol component of the polyurethane foam may further include a catalyst. According to yet other embodiments, the polyol component may also include a surfactant. According to still other embodiments, the polyol component of the polyurethane foam may further include an additive. According to yet other embodiments, the polyol of the polyurethane foam may include any combination of a chain extender, a catalyst, a surfactant and an additive.

According to yet other embodiments, the polyol component of the polyurethane foam may include a polycaprolactone polyol.

According to still other embodiments, the polyol component of the polyurethane foam may include a particular content of the polycaprolactone polyol. For example, the polyol component of the polyurethane foam may include a content of the polycaprolactone polyol of at least about 5 wt. % for a total weight of the polyol component, such as, at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %. According to still other embodiments, the polyol component of the polyurethane foam may include a content of the polycaprolactone polyol of not greater than about 30 wt. % for a total weight of the polyol component, such as, not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %. It will be appreciated that the content of the polycaprolactone polyol in the polyol component may be within a range between any of the minimum and maximum values noted above. It will be further appreciated that the content of the polycaprolactone polyol in the polyol component may be any value between any of the minimum and maximum values noted above.

According to still other embodiments, the polyurethane foam may further include a hollow filler.

According to certain embodiments, the polyurethane foam may include a particular content of the hollow filler. For example, the polyurethane foam may include a content of the hollow filler of at least about 3 wt. % for a total weight of the polyurethane foam, such as, at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or even at least about 7.5 wt. %. According to still other embodiments, the polyurethane foam may include a content of the hollow filler of not greater than about 20 wt. % for a total weight of the polyurethane foam, such as, not greater than about 19.5 wt. % or not greater than about 19.0 wt. % or not greater than about 18.5 wt. % or not greater than about 18.0 wt. % or not greater than about 17.5 wt. % or not greater than about 17.0 wt. % or not greater than about 16.5 wt. % or not greater than about 16.0 wt. % or not greater than about 15.5 wt. % or not greater than about 15.0 wt. % or not greater than about 14.5 wt. % or not greater than about 14.0 wt. % or not greater than about 13.5 wt. % or not greater than about 13.0 wt. % or not greater than about 12.5 wt. % or even not greater than about 12.0 wt. %. It will be appreciated that the content of the hollow filler in the polyurethane foam may be within a range between any of the minimum and maximum values noted above. It will be further appreciated that the content of the hollow filler in the polyurethane foam may be any value between any of the minimum and maximum values noted above.

According to still other embodiments, the polyurethane foam may further include a calcium carbonate filler.

According to certain embodiments, the polyurethane foam may include a particular content of the calcium carbonate filler. For example, the polyurethane foam may include a content of the calcium carbonate filler of at least about 2.0 wt. % for a total weight of the polyurethane foam, such as, at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or at least about 6.0 wt. % or at least about 6.5 wt. % or at least about 7.0 wt. % or even at least about 7.5 wt. %. According to still other embodiments, the polyurethane foam may include a content of the calcium carbonate filler of not greater than about 10 wt. % for a total weight of the polyurethane foam, such as, not greater than about 9.5 wt. % or not greater than about 9.0 wt. % or not greater than about 8.5 wt. % or even not greater than about 8.0 wt. %. It will be appreciated that the content of the calcium carbonate filler in the polyurethane foam may be within a range between any of the minimum and maximum values noted above. It will be further appreciated that the content of the calcium carbonate filler in the polyurethane foam may be any value between any of the minimum and maximum values noted above.

According to still other embodiments, the polyurethane foam may further include a chain extender.

According to certain embodiments, the polyurethane foam may include a particular content of the chain extender. For example, the polyurethane foam may include a content of the chain extender of at least about 2.0 wt. % for a total weight of the polyurethane foam, such as, at least about 2.25 wt. % or at least about 2.5 wt. % or t least about 2.75 wt. % or at least about 3.0 wt. % or at least about 3.25 wt. % or at least about 3.5 wt. % or at least about 3.75 wt. % or even at least about 4.0 wt. %. According to still other embodiments, the polyurethane foam may include a content of the chain extender of not greater than about 8 wt. % for a total weight of the polyurethane foam, such as, not greater than about 8.75 wt. % or not greater than about 8.5 wt. % or not greater than about 8.25 wt. % or not greater than about 8.0 wt. % or not greater than about 7.75 wt. % or not greater than about 7.5 wt. % or not greater than about 7.25 wt. % or not greater than about 7.0 wt. % or not greater than about 6.25 wt. % or not greater than about 6.0 wt. % or not greater than about 6.75 wt. % or even not greater than about 6.5 wt. %. It will be appreciated that the content of the chain extender in the polyurethane foam may be within a range between any of the minimum and maximum values noted above. It will be further appreciated that the content of the chain extender in the polyurethane foam may be any value between any of the minimum and maximum values noted above.

According to still other embodiments, the polyurethane foam may further include a surfactant.

According to certain embodiments, the polyurethane foam may include a particular content of the surfactant. For example, the polyurethane foam may include a content of the surfactant of at least about 0.3 wt. % for a total weight of the polyurethane foam, such as, at least about 0.4 wt. % or at least about 0.5 wt. % or at least about 0.6 wt. % or at least about 0.7 wt. % or at least about 0.8 wt. % or at least about 0.9 wt. % or at least about 1.0 wt. % or at least about 1.5 wt. % or at least about 2.0 wt. % or at least about 2.5 wt. % or at least about 3.0 wt. % or at least about 3.5 wt. % or at least about 4.0 wt. % or at least about 4.5 wt. % or at least about 5.0 wt. % or at least about 5.5 wt. % or even at least about 6.0 wt. %. According to still other embodiments, the polyurethane foam may include a content of the surfactant of not greater than about 10 wt. % for a total weight of the polyurethane foam, such as, not greater than about 9.5 wt. % or not greater than about 9.0 wt. % or not greater than about 8.5 wt. % or not greater than about 8.0 wt. % or not greater than about 7.5 wt. % or even not greater than about 7.0 wt. %. It will be appreciated that the content of the surfactant in the polyurethane foam may be within a range between any of the minimum and maximum values noted above. It will be further appreciated that the content of the surfactant in the polyurethane foam may be any value between any of the minimum and maximum values noted above.

Referring now to a particular use of the polyurethane foam formed according to embodiments described herein, a particular embodiment may include an adhesive tape that may include a layer of a polyurethane foam and an acrylic adhesive layer overlying a surface of the layer of the polyurethane foam. It will be appreciated that the polyurethane foam of the adhesive tape may be formed according to any of the embodiments described herein. It will be further appreciated that the polyurethane foam of the adhesive tape may include any of the components described in reference to any of the embodiments described herein. It will be still further appreciated that the polyurethane foam of the adhesive tape may include any of the characteristics described in reference to embodiments described herein.

According to certain embodiments, the adhesive tape according to embodiments described herein may have a particular peel strength. For purposes of embodiments described herein, peel strength may be measured according to ASTM D1000. According to certain embodiments, the adhesive tape may have a peel strength of at least about 10 N/cm, such as, at least about 11 N/cm or at least about 12 N/cm or at least about 13 N/cm or at least about 14 N/cm or at least about 15 N/cm or at least about 16 N/cm or at least about 17 N/cm or at least about 18 N/cm or at least about 19 N/cm or at least about 20 N/cm or at least about 21 N/cm or at least about 22 N/cm or at least about 23 N/cm or at least about 24 N/cm or even at least about 25 N/cm. It will be appreciated that the peel strength of the adhesive tape may be within a range between any of the values noted above. It will be further appreciated that the peel strength of the adhesive tape may be any value between any of the values noted above.

According to yet other embodiments, the layer of the polyurethane foam may have a particular thickness. For example, the layer of the polyurethane foam may have a thickness of at last about 0.5 mm, such as, at least about 0.55 mm or at least about 0.6 mm or at least about 0.65 mm or at least about 0.7 mm or at least about 0.75 mm or at least about 0.8 mm or at least about 0.85 mm or at least about 0.9 mm or at least about 0.95 mm or at least about 1.0 mm. According to yet other embodiments, the layer of the polyurethane foam may have a thickness of not greater than about 2.0 mm, such as, not greater than about 1.95 mm or not greater than about 1.9 mm or not greater than about 1.85 mm or not greater than about 1.8 mm or not greater than about 1.75 mm or not greater than about 1.7 mm or not greater than about 1.65 mm or not greater than about 1.6 mm or not greater than about 1.55 mm or not greater than about 1.50 mm or not greater than about 1.45 mm or not greater than about 1.4 mm or not greater than about 1.35 mm or not greater than about 1.3 mm or even not greater than about 1.25 mm. It will be appreciated that the thickness of the layer of the polyurethane foam may be within a range between any of the minimum and maximum values noted above. It will be further appreciated that the thickness of the layer of the polyurethane foam may be any value between any of the minimum and maximum values noted above.

According to yet other embodiments, the acrylic adhesive layer may have a particular thickness. For example, the acrylic adhesive layer may have a thickness of at last about 0.05 mm, such as, at least about 0.055 mm or at least about 0.06 mm or at least about 0.065 mm or at least about 0.07 mm or at least about 0.075 mm or at least about 0.08 mm or at least about 0.085 mm or at least about 0.09 mm or at least about 0.095 mm or at least about 0.1 mm. According to yet other embodiments, the acrylic adhesive layer may have a thickness of not greater than about 0.2 mm, such as, not greater than about 0.195 mm or not greater than about 0.19 mm or not greater than about 0.185 mm or not greater than about 0.18 mm or not greater than about 0.175 mm or not greater than about 0.17 mm or not greater than about 0.165 mm or not greater than about 0.16 mm or not greater than about 0.155 mm or not greater than about 0.150 mm or not greater than about 0.145 mm or not greater than about 0.14 mm or not greater than about 0.135 mm or not greater than about 0.13 mm or even not greater than about 0.125 mm. It will be appreciated that the thickness of the acrylic adhesive layer may be within a range between any of the minimum and maximum values noted above. It will be further appreciated that the thickness of the acrylic adhesive layer may be any value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A polyurethane foam comprising: an isocyanate polymer component; and a polyol component comprising a polyol having a molecular weight of at least about 500 kg/mol and not greater than about 6000 kg/mol, wherein the polyurethane foam comprises an elongation of at least about 500%.

Embodiment 2

A polyurethane foam comprising: an isocyanate polymer component; and a polyol component having a molecular weight of at least about 500 kg/mol and not greater than about 6000 kg/mol, wherein the polyurethane foam comprises a density of at least about 250 g/L.

Embodiment 3

A polyurethane foam comprising: an isocyanate polymer component; and a polyol component having a molecular weight of at least about 500 kg/mol and not greater than about 6000 kg/mol, wherein the polyurethane foam comprises a tensile strength of not greater than about 1000 kPa.

Embodiment 4

The polyurethane foam of any one of embodiments 2 and 3, wherein the polyurethane foam comprises an elongation of at least about 500%.

Embodiment 5

The polyurethane foam of any one of embodiments 1 and 3, wherein the polyurethane foam comprises a density of at least about 250 g/L.

Embodiment 6

The polyurethane foam of any one of embodiments 1 and 2, wherein the polyurethane foam comprises a tensile strength of not greater than about 1000 kPa.

Embodiment 7

The polyurethane foam of any one of embodiments 1 and 4, wherein the polyurethane foam comprises an elongation of at least about 550% or at least about 600% or at least about 650% or at least about 700% or at least about 750% or at least about 800% or at least about 850% or at least about 900% or at least about 950% or at least about 1000% or at least about 1050% or at least about 1100% or at least about 1150% or at least about 1200%.

Embodiment 8

The polyurethane foam of any one of embodiments 1 and 4, wherein the polyurethane foam comprises an elongation of not greater than about 2500%.

Embodiment 9

The polyurethane foam of any one of embodiments 2 and 5, wherein the polyurethane foam comprises density of at least about 275 g/L or at least about 300 g/L or at least about 325 g/L or at least about 350 g/L or at least about 375 g/L or at least about 400 g/L or at least about 425 g/L or at least about 450 g/L or at least about 475 g/L or at least about 500 g/L.

Embodiment 10

The polyurethane foam of any one of embodiments 2 and 5, wherein the polyurethane foam comprises density of not greater than about 1000 g/L.

Embodiment 11

The polyurethane foam of any one of embodiments 3 and 6, wherein the polyurethane foam comprises a tensile strength of not greater than about 1000 kPa or not greater than about 950 kPa or not greater than about 900 kPa or not greater than about 850 kPa or not greater than about 800 kPa or not greater than about 750 kPa or not greater than about 700 kPa or not greater than about 650 kPa or not greater than about 600 kPa or not greater than about 550 kPa or not greater than about 500 kPa.

Embodiment 12

The polyurethane foam of any one of embodiments 3 and 6, wherein the polyurethane foam comprises a tensile strength of at least about 200 kPa.

Embodiment 13

The polyurethane foam of any one of embodiments 1, 2, and 3, wherein the polyurethane foam comprises a content of the isocyanate polymer component of at least about 12 wt. % for a total weight of the polyurethane foam, or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 14

The polyurethane foam of embodiment 13, wherein the content of the isocyanate polymer component is not greater than about 40 wt. % for a total weight of the polyurethane foam, or not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. %.

Embodiment 15

The polyurethane foam of any one of embodiments 1, 2, and 3, wherein the isocyanate polymer component comprises a MDI prepolymer, PMDI, or combinations thereof.

Embodiment 16

The polyurethane foam of any one of embodiments 1, 2, and 3, wherein the polyurethane foam comprises a content of the polyol component of at least about 30 wt. % for a total weight of the polyurethane foam, or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. % or at least about 46 wt. % or at least about 47 wt. % or at least about 48 wt. % or at least about 49 wt. % or at least about 50 wt. % or at least about 51 wt. % or at least about 52 wt. % or at least about 53 wt. % or at least about 54 wt. % or at least about 55 wt. %.

Embodiment 17

The polyurethane foam of embodiment 16, wherein the content of the polyol component is not greater than about 85% for a total weight of the polyurethane foam or not greater than about 84 wt. % or not greater than about 83 wt. % or not greater than about 82 wt. % or not greater than about 81 wt. % or not greater than about 80 wt. % or not greater than about 79 wt. % or not greater than about 78 wt. % or not greater than about 77 wt. % or not greater than about 76 wt. % or not greater than about 75 wt. % or not greater than about 74 wt. % or not greater than about 73 wt. % or not greater than about 72 wt. % or not greater than about 71 wt. % or not greater than about 70 wt. % or not greater than about 69 wt. % or not greater than about 68 wt. % or not greater than about 67 wt. % or not greater than about 66 wt. % or not greater than about 65 wt. % or not greater than about 64 wt. % or not greater than about 63 wt. % or not greater than about 62 wt. % or not greater than about 61 wt. % or not greater than about 60 wt. %.

Embodiment 18

The polyurethane foam of any one of embodiments 1, 2, and 3, wherein the polyol component comprises a polyether polyol, a polyester polyol, or combinations thereof.

Embodiment 19

The polyurethane foam of any one of embodiments 1, 2, and 3, wherein the polyol component comprises a chain extender, a catalyst, a surfactant, an additive or combinations thereof.

Embodiment 20

The polyurethane foam of any one of embodiments 1, 2, and 3, wherein the polyol component comprises a polycaprolactone polyol.

Embodiment 21

The polyurethane foam of embodiment 20, wherein the polyol component comprises a content of the polycaprolactone polyol of at least about 5 wt. % for a total weight of the polyol component, or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %.

Embodiment 22

The polyurethane foam of embodiment 21, wherein the polyol component comprises a content of the polycaprolactone polyol of not greater than about 30 wt. % for a total weight of the polyol component, or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 23

The polyurethane foam of any one of embodiments 1, 2, and 3, wherein the polyurethane foam further comprises hollow filler.

Embodiment 24

The polyurethane foam of embodiment 23, wherein the polyurethane foam comprises a content of the hollow filler of at least about 3 wt. % for a total weight of the polyurethane foam, or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. %.

Embodiment 25

The polyurethane foam of embodiment 24, wherein the content of the hollow filler is not greater than about 20 wt. % for a total weigh of the polyurethane foam, or not greater than about 19 wt. % or not greater than about 18 wt. % or not greater than about 17 wt. % or not greater than about 16 wt. % or not greater than about 15 wt. % or not greater than about 14 wt. % or not greater than about 13 wt. %.

Embodiment 26

The polyurethane foam of any one of embodiments 1, 2, and 3, wherein the polyurethane foam further comprises a calcium carbonate filler.

Embodiment 27

The polyurethane foam of embodiment 26, wherein the polyurethane foam comprises a content of the calcium carbonate filler of at least about 2 wt. % for a total weigh of the polyurethane foam, or not greater than about 3 wt. % or not greater than about 4 wt. % or not greater than about 5 wt. %.

Embodiment 28

The polyurethane foam of embodiment 27, wherein the content of the calcium carbonate filler is not greater than about 10 wt. % for a total weight of the polyurethane foam, or not greater than about 9 wt. % or not greater than about 8 wt. % or not greater than about 7 wt. % or not greater than about 6 wt. %.

Embodiment 29

The polyurethane foam of any one of embodiments 1, 2, and 3, wherein the polyol component further comprises a chain extender.

Embodiment 30

The polyurethane foam of embodiment 29, wherein the polyol component comprises a content of the chain extender of at least about 2 wt. % for a total weigh of the polyurethane foam, or not greater than about 3 wt. % or not greater than about 4 wt. %.

Embodiment 31

The polyurethane foam of embodiment 30, wherein the content of the chain extender is not greater than about 8 wt. % for a total weigh of the polyurethane foam or not greater than about 7 wt. % or not greater than about 6 wt. % or not greater than about 5 wt. %.

Embodiment 32

The polyurethane foam of any one of embodiments 1, 2, and 3, wherein the polyurethane foam further comprises a surfactant.

Embodiment 33

The polyurethane foam of embodiment 32, wherein the polyurethane foam comprises a content of the surfactant of at least about 0.3 wt. % for a total weight of the polyurethane foam, or not greater than about 0.5 wt. % or not greater than about 1.0 wt. % or not greater than about 2 wt. % or not greater than about 3 wt. % or not greater than about 4 wt. % or not greater than about 5 wt. %.

Embodiment 34

The polyurethane foam of embodiment 33, wherein the content of the surfactant is not greater than about 10 wt. % for a total weight of the polyurethane foam, or not greater than about 9 wt. % or not greater than about 8 wt. % or not greater than about 7 wt. % or not greater than about 6 wt. %.

Embodiment 35

An adhesive tape comprising a layer of a polyurethane foam and an acrylic adhesive layer overlying a surface of the layer of the polyurethane foam, wherein the polyurethane foam comprises: an isocyanate polymer component; and a polyol component comprising a polyol having a molecular weight of at least about 500 kg/mol and not greater than about 6000 kg/mol, wherein the polyurethane foam comprises an elongation of at least about 500%.

Embodiment 36

An adhesive tape comprising a layer of a polyurethane foam and an acrylic adhesive layer overlying a surface of the layer of the polyurethane foam, wherein the polyurethane foam comprises: an isocyanate polymer component; and a polyol component having a molecular weight of at least about 500 kg/mol and not greater than about 6000 kg/mol, wherein the polyurethane foam comprises a density of at least about 250 g/L.

Embodiment 37

An adhesive tape comprising a layer of a polyurethane foam and an acrylic adhesive layer overlying a surface of the layer of the polyurethane foam, wherein the polyurethane foam comprises: an isocyanate polymer component; and a polyol component having a molecular weight of at least about 500 kg/mol and not greater than about 6000 kg/mol, wherein the adhesive tape comprises a peel strength of at least about 10 N/cm.

Embodiment 38

The adhesive tape of any one of embodiments 36 and 37, wherein the polyurethane foam comprises an elongation of at least about 500%.

Embodiment 39

The adhesive tape of any one of embodiments 35 and 37, wherein the polyurethane foam comprises a density of at least about 250 g/L.

Embodiment 40

The adhesive tape of any one of embodiments 35 and 36, wherein the adhesive tape comprises a peel strength of at least about 10 N/cm.

Embodiment 41

The adhesive tape of any one of embodiments 35 and 38, wherein the polyurethane foam comprises an elongation of at least about 550% or at least about 600% or at least about 650% or at least about 700% or at least about 750% or at least about 800% or at least about 850% or at least about 900% or at least about 950% or at least about 1000% or at least about 1050% or at least about 1100% or at least about 1150% or at least about 1200%.

Embodiment 42

The adhesive tape of any one of embodiments 35 and 38, wherein the polyurethane foam comprises an elongation of not greater than about 2500%.

Embodiment 43

The adhesive tape of any one of embodiments 36 and 39, wherein the polyurethane foam comprises density of at least about 275 g/L or at least about 300 g/L or at least about 325 g/L or at least about 350 g/L or at least about 375 g/L or at least about 400 g/L or at least about 425 g/L or at least about 450 g/L or at least about 475 g/L or at least about 500 g/L.

Embodiment 44

The adhesive tape of any one of embodiments 36 and 39, wherein the polyurethane foam comprises density of not greater than about 1000 g/L.

Embodiment 45

The adhesive tape of any one of embodiments 37 and 40, wherein the adhesive tape comprises a peel strength of at least about 10 N/cm or at least about 11 N/cm or at least about 12 N/cm or at least about 13 N/cm or at least about 14 N/cm or at least about 15 N/cm or at least about 16 N/cm or at least about 17 N/cm or at least about 18 N/cm or at least about 19 N/cm or at least about 20 N/cm or at least about 21 N/cm or at least about 22 N/cm or at least about 23 N/cm or at least about 24 N/cm or at least about 25 N/cm.

Embodiment 46

The adhesive tape of any one of embodiments 35, 36, and 37, wherein the polyurethane foam comprises a content of the isocyanate polymer component of at least about 12 wt. % for a total weight of the polyurethane foam, or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 47

The adhesive tape of embodiment 46, wherein the content of the isocyanate polymer component is not greater than about 40 wt. % for a total weight of the polyurethane foam, or not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. %.

Embodiment 48

The adhesive tape of any one of embodiments 35, 36, and 37, wherein the isocyanate polymer component comprises a MDI prepolymer, PMDI, or combinations thereof.

Embodiment 49

The adhesive tape of any one of embodiments 35, 36, and 37, wherein the polyurethane foam comprises a content of the polyol component of at least about 30 wt. % for a total weight of the polyurethane foam, or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. % or at least about 46 wt. % or at least about 47 wt. % or at least about 48 wt. % or at least about 49 wt. % or at least about 50 wt. % or at least about 51 wt. % or at least about 52 wt. % or at least about 53 wt. % or at least about 54 wt. % or at least about 55 wt. %.

Embodiment 50

The adhesive tape of embodiment 49, wherein the content of the polyol component is not greater than about 85 wt. % for a total weight of the polyurethane foam or not greater than about 84 wt. % or not greater than about 83 wt. % or not greater than about 82 wt. % or not greater than about 81 wt. % or not greater than about 80 wt. % or not greater than about 79 wt. % or not greater than about 78 wt. % or not greater than about 77 wt. % or not greater than about 76 wt. % or not greater than about 75 wt. % or not greater than about 74 wt. % or not greater than about 73 wt. % or not greater than about 72 wt. % or not greater than about 71 wt. % or not greater than about 70 wt. % or not greater than about 69 wt. % or not greater than about 68 wt. % or not greater than about 67 wt. % or not greater than about 66 wt. % or not greater than about 65 wt. % or not greater than about 64 wt. % or not greater than about 63 wt. % or not greater than about 62 wt. % or not greater than about 61 wt. % or not greater than about 60 wt. %.

Embodiment 51

The adhesive tape of any one of embodiments 35, 36, and 37, wherein the polyol component comprises a polyether polyol, a polyester polyol, or combinations thereof.

Embodiment 52

The adhesive tape of any one of embodiments 35, 36, and 37, wherein the polyol component comprises a chain extender, a catalyst, a surfactant, an additive or combinations thereof.

Embodiment 53

The adhesive tape of any one of embodiments 35, 36, and 37, wherein the polyol component comprises a polycaprolactone polyol.

Embodiment 54

The adhesive tape of embodiment 53, wherein the polyol component comprises a content of the polycaprolactone polyol of at least about 5 wt. % for a total weight of the polyol component, or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %.

Embodiment 55

The adhesive tape of embodiment 54, wherein the polyol component comprises a content of the polycaprolactone polyol of not greater than about 30 wt. % for a total weight of the polyol component, or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 56

The adhesive tape of any one of embodiments 35, 36, and 37, wherein the polyurethane foam further comprises hollow filler.

Embodiment 57

The adhesive tape of embodiment 56, wherein the polyurethane foam comprises a content of the hollow filler of at least about 3 wt. % for a total weight of the polyurethane foam, or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. %.

Embodiment 58

The adhesive tape of embodiment 57, wherein the content of the hollow filler is not greater than about 20 wt. % for a total weigh of the polyurethane foam, or not greater than about 19 wt. % or not greater than about 18 wt. % or not greater than about 17 wt. % or not greater than about 16 wt. % or not greater than about 15 wt. % or not greater than about 14 wt. % or not greater than about 13 wt. %.

Embodiment 59

The adhesive tape of any one of embodiments 35, 36, and 37, wherein the polyurethane foam further comprises a calcium carbonate filler.

Embodiment 60

The adhesive tape of embodiment 59, wherein the polyurethane foam comprises a content of the calcium carbonate filler of at least about 2 wt. % for a total weigh of the polyurethane foam, or not greater than about 3 wt. % or not greater than about 4 wt. % or not greater than about 5 wt. %.

Embodiment 61

The adhesive tape of embodiment 60, wherein the content of the calcium carbonate filler is not greater than about 10 wt. % for a total weight of the polyurethane foam, or not greater than about 9 wt. % or not greater than about 8 wt. % or not greater than about 7 wt. % or not greater than about 6 wt. %.

Embodiment 62

The adhesive tape of any one of embodiments 35, 36, and 37, wherein the polyol component further comprises a chain extender.

Embodiment 63

The adhesive tape of embodiment 62, wherein the polyol component comprises a content of the chain extender of at least about 2 wt. % for a total weigh of the polyurethane foam, or not greater than about 3 wt. % or not greater than about 4 wt. %.

Embodiment 64

The adhesive tape of embodiment 63, wherein the content of the chain extender is not greater than about 8 wt. % for a total weigh of the polyurethane foam or not greater than about 7 wt. % or not greater than about 6 wt. % or not greater than about 5 wt. %.

Embodiment 65

The adhesive tape of any one of embodiments 35, 36, and 37, wherein the polyurethane foam further comprises a surfactant.

Embodiment 66

The adhesive tape of embodiment 65, wherein the polyurethane foam comprises a content of the surfactant of at least about 0.3 wt. % for a total weight of the polyurethane foam, or not greater than about 0.5 wt. % or not greater than about 1.0 wt. % or not greater than about 2 wt. % or not greater than about 3 wt. % or not greater than about 4 wt. % or not greater than about 5 wt. %.

Embodiment 67

The adhesive tape of embodiment 66, wherein the content of the surfactant is not greater than about 10 wt. % for a total weight of the polyurethane foam, or not greater than about 9 wt. % or not greater than about 8 wt. % or not greater than about 7 wt. % or not greater than about 6 wt. %.

Embodiment 68

The adhesive tape of any one of embodiments 35, 36, and 37, wherein the layer of the polyurethane foam comprises a thickness of at least about 0.5 mm.

Embodiment 69

The adhesive tape of embodiment 68, wherein the layer of the polyurethane foam comprises a thickness of not greater than about 2.0 mm.

Embodiment 70

The adhesive tape of any one of embodiments 35, 36, and 37, wherein the acrylic adhesive layer comprises a thickness of at least about 0.05 mm.

Embodiment 71

The adhesive tape of embodiment 70, wherein the acrylic adhesive layer comprises a thickness of not greater than about 0.2 mm.

Embodiment 72

A method of forming a polyurethane foam comprising: providing a foam-forming component A comprising a polyol component having a molecular weight of at least about 500 kg/mol; providing a foam-forming component B comprising an isocyanate polymer component; mixing the foam-forming component A and the foam-forming component B to form a foam-forming mixture; and forming the foam-forming mixture into a polyurethane foam.

Embodiment 73

The method of embodiment 72, wherein the foam-forming component B comprises a content of the isocyanate polymer component of at least about 90 wt. % for a total weight of the foam-forming component B.

Embodiment 74

The method of embodiment 73, wherein the content of the isocyanate polymer component in the foam-forming component B is not greater than about 100 wt. % for a total weight of the foam-forming component B.

Embodiment 75

The method of embodiment 72, wherein the foam-forming mixture comprises a content of the isocyanate polymer component of at least about 12 wt. % for a total weight of the foam-forming mixture.

Embodiment 76

The method of embodiment 75, wherein the content of the isocyanate polymer component in the foam-forming mixture is not greater than about 40 wt. % for a total weight of the foam-forming mixture.

Embodiment 77

The method of any one of the previous embodiments, wherein the isocyanate polymer component comprises a MDI prepolymer, PMDI, or combinations thereof.

Embodiment 78

The method of embodiment 72, wherein the foam-forming component A comprises a content of the polyol of at least about 35 wt. % for a total weight of the foam-forming component A.

Embodiment 79

The method of embodiment 78, wherein the content of the polyol component in the foam-forming component A is not greater than about 100 wt. % for a total weight of the foam-forming component A.

Embodiment 80

The method of embodiment 72, wherein the foam-forming mixture comprises a content of the polyol of at least about 30 wt. % for a total weight of the foam-forming mixture.

Embodiment 81

The method of embodiment 80, wherein the content of the polyol component in the foam-forming mixture is not greater than about 85% for a total weight of the foam-forming mixture.

Embodiment 82

The method of embodiment 72, wherein the polyol component comprises a polyether polyol, a polyester polyol, or combinations thereof.

Embodiment 83

The method of embodiment 72, wherein the polyol component comprises a chain extender, a catalyst, a surfactant, an additive or combinations thereof.

Embodiment 84

The method of embodiment 72, wherein the polyol component comprises a polycaprolactone polyol.

Embodiment 85

The method of embodiment 84, wherein the polyol component comprises a content of the polycaprolactone polyol of at least about 5 wt. % for a total weight of the polyol component, or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %.

Embodiment 86

The method of embodiment 85, wherein the polyol component comprises a content of the polycaprolactone polyol of not greater than about 30 wt. % for a total weight of the polyol component, or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 87

The method of embodiment 72, wherein the foam-forming component A further comprises hollow filler.

Embodiment 88

The method of embodiment 87, wherein the foam-forming component A comprises a content of the hollow filler of at least about 4 wt. % for a total weight of the foam-forming component A.

Embodiment 89

The method of embodiment 88, wherein the foam-forming component A comprises a content of the hollow filler of not greater than about 25 wt. % for a total weight of the foam-forming component A.

Embodiment 90

The method of embodiment 87, wherein the foam-forming mixture comprises a content of the hollow filler of at least about 3 wt. % for a total weight of the foam-forming mixture.

Embodiment 91

The method of embodiment 90, wherein the foam-forming mixture comprises a content of the hollow filler of not greater than about 20 wt. % for a total weight of the foam-forming mixture.

Embodiment 92

The method of embodiment 72, wherein the foam-forming component A further comprises a calcium carbonate filler.

Embodiment 93

The method of embodiment 92, wherein the foam-forming component A comprises a content of the calcium carbonate filler of at least about 3 wt. % for a total weight of the foam-forming component A.

Embodiment 94

The method of embodiment 93, wherein the content of the calcium carbonate filler in the foam-forming component A is not greater than about 15 wt. % for a total weight of the foam-forming component A.

Embodiment 95

The method of embodiment 92, wherein the foam-forming mixture comprises a content of the calcium carbonate filler of at least about 2 wt. % for a total weight of the foam-forming mixture.

Embodiment 96

The method of embodiment 95, wherein the foam-forming mixture comprises a content of the calcium carbonate filler of not greater than about 10 wt. % for a total weight of the foam-forming mixture.

Embodiment 97

The method of embodiment 72, wherein the foam-forming component A further comprises a chain extender.

Embodiment 98

The method of embodiment 97, wherein the foam-forming component A comprises a content of the chain extender of at least about 2.5 wt. % for a total weight of the foam-forming component A.

Embodiment 99

The method of embodiment 98, wherein the foam-forming component A comprises a content of the chain extender of not greater than about 10 wt. % for a total weight of the foam-forming component A.

Embodiment 100

The method of embodiment 97, wherein the foam-forming mixture comprises a content of the chain extender of at least about 2 wt. % for a total weight of the foam-forming mixture.

Embodiment 101

The method of embodiment 100, the foam-forming mixture comprises a content of the chain extender of not greater than about 8 wt. % for a total weight of the foam-forming mixture.

Embodiment 102

The method of embodiment 72, wherein the foam-forming component A further comprises a surfactant.

Embodiment 103

The method of embodiment 102, wherein the foam-forming component A comprises a content of the surfactant of at least about 0.4 wt. % for a total weight of the foam-forming component A.

Embodiment 104

The method of embodiment 103, wherein the foam-forming component A comprises a content of the surfactant of not greater than about 12 wt. % for a total weight of the foam-forming component A.

Embodiment 105

The method of embodiment 102, wherein the foam-forming mixture comprises a content of the surfactant of at least about 0.3 wt. % for a total weight of the foam-forming mixture.

Embodiment 106

The method of embodiment 105, wherein the foam-forming mixture comprises a content of the surfactant of not greater than about 10 wt. % for a total weight of the foam-forming mixture.

Embodiment 107

The method of embodiment 72, wherein the polyurethane foam comprises an elongation of at least about 500%.

Embodiment 108

The method of embodiment 72, wherein the polyurethane foam comprises a density of at least about 250 g/L.

Embodiment 109

The method of embodiment 72, wherein the adhesive tape comprises a peel strength of at least about 10 N/cm.

Embodiment 110

The method of embodiment 107, wherein the polyurethane foam comprises an elongation of at least about 550% or at least about 600% or at least about 650% or at least about 700% or at least about 750% or at least about 800% or at least about 850% or at least about 900% or at least about 950% or at least about 1000% or at least about 1050% or at least about 1100% or at least about 1150% or at least about 1200%.

Embodiment 111

The method of embodiment 107, wherein the polyurethane foam comprises an elongation of not greater than about 2500%.

Embodiment 112

The method of embodiment 108, wherein the polyurethane foam comprises density of at least about 275 g/L or at least about 300 g/L or at least about 325 g/L or at least about 350 g/L or at least about 375 g/L or at least about 400 g/L or at least about 425 g/L or at least about 450 g/L or at least about 475 g/L or at least about 500 g/L.

Embodiment 113

The method of embodiment 108, wherein the polyurethane foam comprises density of not greater than about 1000 g/L.

Embodiment 114

The method of embodiment 109, wherein the polyurethane foam comprises a tensile strength of not greater than about 1000 kPa or not greater than about 950 kPa or not greater than about 900 kPa or not greater than about 850 kPa or not greater than about 800 kPa or not greater than about 750 kPa or not greater than about 700 kPa or not greater than about 650 kPa or not greater than about 600 kPa or not greater than about 550 kPa or not greater than about 500 kPa.

Embodiment 115

The method of embodiment 72, wherein the polyurethane foam comprises a content of the isocyanate polymer component of at least about 12 wt. % for a total weight of the polyurethane foam, or at least about 13 wt. % or at least about 14 wt. % or at least about 15 wt. % or at least about 16 wt. % or at least about 17 wt. % or at least about 18 wt. % or at least about 19 wt. % or at least about 20 wt. % or at least about 21 wt. % or at least about 22 wt. % or at least about 23 wt. % or at least about 24 wt. % or at least about 25 wt. %.

Embodiment 116

The method of embodiment 115, wherein the content of the isocyanate polymer component is not greater than about 40 wt. % for a total weight of the polyurethane foam, or not greater than about 39 wt. % or not greater than about 38 wt. % or not greater than about 37 wt. % or not greater than about 36 wt. % or not greater than about 35 wt. % or not greater than about 34 wt. % or not greater than about 33 wt. % or not greater than about 32 wt. % or not greater than about 31 wt. % or not greater than about 30 wt. % or not greater than about 29 wt. % or not greater than about 28 wt. % or not greater than about 27 wt. % or not greater than about 26 wt. %.

Embodiment 117

The method of embodiment 72, wherein the isocyanate polymer component comprises a MDI prepolymer, PMDI, or combinations thereof.

Embodiment 118

The method of embodiment 72, wherein the polyurethane foam comprises a content of the polyol component of at least about 30 wt. % for a total weight of the polyurethane foam, or at least about 31 wt. % or at least about 32 wt. % or at least about 33 wt. % or at least about 34 wt. % or at least about 35 wt. % or at least about 36 wt. % or at least about 37 wt. % or at least about 38 wt. % or at least about 39 wt. % or at least about 40 wt. % or at least about 41 wt. % or at least about 42 wt. % or at least about 43 wt. % or at least about 44 wt. % or at least about 45 wt. % or at least about 46 wt. % or at least about 47 wt. % or at least about 48 wt. % or at least about 49 wt. % or at least about 50 wt. % or at least about 51 wt. % or at least about 52 wt. % or at least about 53 wt. % or at least about 54 wt. % or at least about 55 wt. %.

Embodiment 119

The method of embodiment 118, wherein the content of the polyol component is not greater than about 85% for a total weight of the polyurethane foam or not greater than about 79 wt. % or not greater than about 78 wt. % or not greater than about 77 wt. % or not greater than about 76 wt. % or not greater than about 75 wt. % or not greater than about 74 wt. % or not greater than about 73 wt. % or not greater than about 72 wt. % or not greater than about 71 wt. % or not greater than about 70 wt. % or not greater than about 69 wt. % or not greater than about 68 wt. % or not greater than about 67 wt. % or not greater than about 66 wt. % or not greater than about 65 wt. % or not greater than about 64 wt. % or not greater than about 63 wt. % or not greater than about 62 wt. % or not greater than about 61 wt. % or not greater than about 60 wt. %.

Embodiment 120

The method of embodiment 72, wherein the polyol component comprises a polyether polyol, a polyester polyol, or combinations thereof.

Embodiment 121

The method of embodiment 72, wherein the polyol component comprises a chain extender, a catalyst, a surfactant, an additive or combinations thereof.

Embodiment 122

The method of embodiment 72, wherein the polyol component comprises a polycaprolactone polyol.

Embodiment 123

The method of embodiment 122, wherein the polyol component comprises a content of the polycaprolactone polyol of at least about 5 wt. % for a total weight of the polyol component, or at least about 6 wt. % or at least about 7 wt. % or at least about 8 wt. % or at least about 9 wt. % or at least about 10 wt. % or at least about 11 wt. % or at least about 12 wt. % or at least about 13 wt. % or at least about 14 wt. % or at least about 15 wt. %.

Embodiment 124

The method of embodiment 123, wherein the polyol component comprises a content of the polycaprolactone polyol of not greater than about 30 wt. % for a total weight of the polyol component, or not greater than about 29 wt. % or not greater than about 28 wt. % or not greater than about 27 wt. % or not greater than about 26 wt. % or not greater than about 25 wt. % or not greater than about 24 wt. % or not greater than about 23 wt. % or not greater than about 22 wt. % or not greater than about 21 wt. % or not greater than about 20 wt. % or not greater than about 19 wt. % or not greater than about 18 wt. %.

Embodiment 125

The method of embodiment 72, wherein the polyurethane foam further comprises hollow filler.

Embodiment 126

The method of embodiment 125, wherein the polyurethane foam comprises a content of the hollow filler of at least about 3 wt. % for a total weight of the polyurethane foam, or at least about 4 wt. % or at least about 5 wt. % or at least about 6 wt. % or at least about 7 wt. % or at least about 8 wt. % or at least about 9 wt. % or at least about 10 wt. % or at least about 11 wt. % or at least about 12 wt. %.

Embodiment 127

The method of embodiment 126, wherein the content of the hollow filler is not greater than about 20 wt. % for a total weigh of the polyurethane foam, or not greater than about 19 wt. % or not greater than about 18 wt. % or not greater than about 17 wt. % or not greater than about 16 wt. % or not greater than about 15 wt. % or not greater than about 14 wt. % or not greater than about 13 wt. %.

Embodiment 128

The method of embodiment 72, wherein the polyurethane foam further comprises a calcium carbonate filler.

Embodiment 129

The method of embodiment 128, wherein the polyurethane foam comprises a content of the calcium carbonate filler of at least about 2 wt. % for a total weigh of the polyurethane foam, or not greater than about 3 wt. % or not greater than about 4 wt. % or not greater than about 5 wt. %.

Embodiment 130

The method of embodiment 129, wherein the content of the calcium carbonate filler is not greater than about 10 wt. % for a total weight of the polyurethane foam, or not greater than about 9 wt. % or not greater than about 8 wt. % or not greater than about 7 wt. % or not greater than about 6 wt. %.

Embodiment 131

The method of embodiment 72, wherein the polyol component further comprises a chain extender.

Embodiment 132

The method of embodiment 131, wherein the polyol component comprises a content of the chain extender of at least about 2 wt. % for a total weigh of the polyurethane foam, or not greater than about 3 wt. % or not greater than about 4 wt. %.

Embodiment 133

The method of embodiment 132, wherein the content of the chain extender is not greater than about 8 wt. % for a total weigh of the polyurethane foam or not greater than about 7 wt. % or not greater than about 6 wt. % or not greater than about 5 wt. %.

Embodiment 134

The method of embodiment 72, wherein the polyurethane foam further comprises a surfactant.

Embodiment 135

The method of embodiment 134, wherein the polyurethane foam comprises a content of the surfactant of at least about 0.3 wt. % for a total weight of the polyurethane foam, or not greater than about 0.5 wt. % or not greater than about 1.0 wt. % or not greater than about 2 wt. % or not greater than about 3 wt. % or not greater than about 4 wt. % or not greater than about 5 wt. %.

Embodiment 136

The method of embodiment 135, wherein the content of the surfactant is not greater than about 10 wt. % for a total weight of the polyurethane foam, or not greater than about 9 wt. % or not greater than about 8 wt. % or not greater than about 7 wt. % or not greater than about 6 wt. %.

EXAMPLES

The concepts described herein will be further described in the following Examples, which do not limit the scope of the invention described in the claims.

Example 1

Four sample polyurethane foams S1, S2, S3 and S4 were formed according to embodiments described herein. The compositions of each sample polyurethane foam S1, S2, S3 and S4 are summarized in Table 1 below.

TABLE 1

Sample Foam Composition

| Components | S1 | S2 | S3 | S4 |
|---|---|---|---|---|
| Mixing ratio (Component A:Component B) | 77:23 | 81:19 | 83:17 | 71:29 |
| Component A (wt. % for a total weight of the Component A) | | | | |
| Polyol 1 (Mw = 4000, Fn = 2) | 64.0 | 69.0 | 80.2 | 55.0 |
| Polyol 2 (Mw = 1000, Fn = 3) | 15.0 | | | 20.0 |
| Polycaprolactone polyol | | 12.0 | | 8.0 |
| Chain extender | 4.0 | 3.0 | 5.0 | 3.0 |
| Surfactant | 1.5 | 1.0 | 2.0 | 0.5 |
| Catalyst | 0.5 | 1.0 | 0.8 | 0.5 |
| Hollow filler | 10.0 | 8.0 | 12.0 | 8.0 |
| calcium carbonate filler | 5.0 | 6.0 | | 5.0 |
| Component B (wt. % for a total weight of the Component B) | | | | |
| PMDI | 50 | 20 | | 30 |
| MDI prepolymer | 50 | 80 | 100 | 70 |

Each of the sample polyurethane foams were formed by mixing all the liquid components (including the base polyols, surfactant, catalyst, pigment, chain extender, thixotropic agent) until the liquid phase is homogeneous. Then, the fillers (including the hollow filler, calcium carbonate filler) were added to the liquid mixture. The combined mixture was then mixed until it reached a homogeneous composition. Finally, the isocyanate was added to the combined mixture. The final mixture was coated on a release liner (PET liner or paper liner) with a certain thickness (such as 1.0 mm), and then cured in an over at a certain temperature (such as 150° C. or 170° C.) for several minutes.

Each of the sample polyurethane foams were tested to various characteristics and performance properties including foam density, tensile strength, elongation and Peel strength. The results of the tests are summarized in Table 2 below.

TABLE 2

Polyurethane Foam Characteristics and Performance Properties

| Characteristics/Properties | S1 | S2 | S3 | S4 |
|---|---|---|---|---|
| Foam Density (g/L) | 500 | 600 | 550 | 700 |
| Tensile strength (MPa) | 0.55 | 0.60 | 0.30 | 0.95 |
| Elongation (%) | 800% | 1000% | 1500% | 600% |
| 90° Peel strength (N/cm) | 45 | 68 | 50 | 60 |

Example 2

A sample polyurethane foam S5 was formed according to embodiments described herein and a comparison sample CS1 was prepare for comparison to the sample polyurethane foam S5. The compositions of each sample polyurethane foam S5 and CS1 are summarized in Table 3 below.

TABLE 3

Sample Foam Compositions

| Components | S5 | CS1 |
|---|---|---|
| Mixing ratio (Component A:Component B) | 100:22 | 100:36 |
| Component A (wt. % for a total weight of the Component A) | | |
| Polyol 1 (Mw = 4000, Fn = 2) | 58.5 | |
| Polyol 2 (Mw = 3000, Fn = 3) | 20.0 | 90.0 |
| Polyol 3 (Mw = 600, Fn = 3) | 5.0 | |
| Polycaprolactone polyol | | |
| Chain extender | 4.0 | 8.0 |
| Surfactant | 2.0 | 1.2 |
| Catalyst | 0.5 | 0.8 |
| Hollow filler | 10.0 | |
| calcium carbonate filler | | |
| Component B (wt. % for a total weight of the Component B) | | |
| PMDI | 0.0 | 20.0 |
| MDI prepolymer | 100.0 | 80.0 |

Each of the sample polyurethane foams S5 and CS1 were formed by mixing all the liquid components (including the base polyols, surfactant, catalyst, pigment, chain extender, thixotropic agent) until the liquid phase is homogeneous. Then, the fillers (including the hollow filler, calcium carbonate filler) were added to the liquid mixture. The combined mixture was then mixed until it reached a homogeneous composition. Finally, the isocyanate was added to the combined mixture. The final mixture was coated on a release liner (PET liner or paper liner) with a certain thickness (such as 1.0 mm), and then cured in an over at a certain temperature (such as 150° C. or 170° C.) for several minutes.

Each of the sample polyurethane foams S5 and CS1 were tested to determine various characteristics and performance properties including foam density, tensile strength, elongation and Peel strength. The results of the tests are summarized in Table 4 below.

TABLE 4

Polyurethane Foam Characteristics and Performance Properties

| Characteristics/Properties | S5 | CS1 |
|---|---|---|
| Foam Thickness (mm) | 0.92 | 1.0 |
| Foam Density (g/L) | 640 | 480 |
| Tensile strength (MPa) | 0.58 | 0.90 |

TABLE 4-continued

Polyurethane Foam Characteristics and Performance Properties

| Characteristics/Properties | S5 | CS1 |
|---|---|---|
| Elongation (%) | 1331 | 275 |
| Acrylic Adhesive Thickness (mm) | 0.10 | 0.10 |
| 90° Peel strength (N/cm) | 48.6 | 12.0 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A polyurethane foam comprising:
an isocyanate polymer component; and
a polyol component comprising a polyol having a molecular weight of at least about 500 kg/mol and not greater than about 6000 kg/mol,
wherein the polyurethane foam comprises a content of the isocyanate polymer component of at least about 19 wt. %, and
wherein the polyurethane foam comprises an elongation of at least about 500%.

2. The polyurethane foam of claim 1, wherein the polyurethane foam comprises a density of at least about 250 g/L.

3. The polyurethane foam of claim 1, wherein the polyurethane foam comprises a tensile strength of not greater than about 1000 kPa.

4. The polyurethane foam of claim 1, wherein the polyurethane foam comprises a content of the isocyanate polymer component of not greater than about 40 wt. % for a total weight of the polyurethane foam.

5. The polyurethane foam of claim 1, wherein the isocyanate polymer component comprises a MDI prepolymer, PMDI, or combinations thereof.

6. The polyurethane foam of claim 1, wherein the polyurethane foam comprises a content of the polyol component of at least about 30 wt. % and not greater than about 85 wt. % for a total weight of the polyurethane foam.

7. The polyurethane foam of claim 1, wherein the polyol component comprises a polyether polyol, a polyester polyol, or combinations thereof.

8. The polyurethane foam of claim 1, wherein the polyol component comprises a chain extender, a catalyst, a surfactant, an additive or combinations thereof.

9. The polyurethane foam of claim 1, wherein the polyol component comprises a polycaprolactone polyol.

10. The polyurethane foam of claim 9, wherein the polyol component comprises a content of the polycaprolactone polyol of at least about 5 wt. % and not greater than about 30 wt. % for a total weight of the polyol component.

11. The polyurethane foam of claim 1, wherein the polyurethane foam further comprises hollow filler.

12. The polyurethane foam of claim 11, wherein the polyurethane foam comprises a content of the hollow filler of at least about 3 wt. % and not greater than about 20 wt. % for a total weight of the polyurethane foam.

13. An adhesive tape comprising a layer of a polyurethane foam and an acrylic adhesive layer overlying a surface of the layer of the polyurethane foam, wherein the polyurethane foam comprises:
an isocyanate polymer component; and
a polyol component having a molecular weight of at least about 500 kg/mol and not greater than about 6000 kg/mol,
wherein the polyurethane foam comprises a content of the isocyanate polymer component of at least about 19 wt. %, and
wherein the adhesive tape comprises a peel strength of at least about 10 N/cm.

14. The adhesive tape of claim 13, wherein the polyurethane foam comprises an elongation of at least about 500%.

15. The adhesive tape of claim 13, wherein the polyurethane foam comprises a density of at least about 250 g/L.

16. The adhesive tape of claim 13, wherein the polyurethane foam comprises a tensile strength of not greater than about 1000 kPa.

17. The adhesive tape of claim 13, wherein the polyurethane foam comprises a content of the isocyanate polymer component of not greater than about 40 wt. % for a total weight of the polyurethane foam.

18. The adhesive tape of claim 13, wherein the isocyanate polymer component comprises a MDI prepolymer, PMDI, or combinations thereof.

19. The adhesive tape of claim 13, wherein the polyurethane foam comprises a content of the polyol component of at least about 30 wt. % and not greater than about 85 wt. % for a total weight of the polyurethane foam.

20. A method of forming a polyurethane foam comprising:
providing a foam-forming component A comprising a polyol component having a molecular weight of at least about 500 kg/mol and not greater than 6000 kg/mol;
providing a foam-forming component B comprising an isocyanate polymer component;
mixing the foam-forming component A and the foam-forming component B to form a foam-forming mixture; and
forming the foam-forming mixture into a polyurethane foam wherein the polyurethane foam comprises a content of the isocyanate polymer component of at least about 19 wt. %, and wherein the polyurethane foam comprises an elongation of at least about 500%.

* * * * *